United States Patent [19]
Muller

[11] 3,967,799
[45] July 6, 1976

[54] HEAD UP DISPLAY AND PITCH GENERATOR

[75] Inventor: Hans Rudolf Muller, Kirkland, Wash.

[73] Assignee: Sundstrand Data Control, Inc., Redmond, Wash.

[22] Filed: Nov. 25, 1974

[21] Appl. No.: 527,044

Related U.S. Application Data

[62] Division of Ser. No. 307,726, Nov. 17, 1972, Pat. No. 3,851,303.

[52] U.S. Cl. .............................. 244/181; 73/178 R; 235/150.2; 318/584; 340/27 AT; 356/251
[51] Int. Cl.² ................ B64C 13/18; G05D 1/08
[58] Field of Search ................... 78/178 R, 178 T; 235/150.2, 150.22; 244/77 A, 77 D, 77 E, 77 G, 181; 318/584; 340/27 R, 27 NA, 27 AT; 356/251

[56] References Cited
UNITED STATES PATENTS

| | | |
|---|---|---|
| 3,681,580 | 8/1972 | Gwathmey et al. ............ 235/150.22 |
| 3,686,626 | 8/1972 | Bateman et al. ............... 244/77 D X |
| 3,744,309 | 7/1973 | Astengo ............................. 73/178 R |
| 3,752,420 | 8/1973 | Osder................................. 244/77 D |

*Primary Examiner*—Stephen G. Kunin
*Attorney, Agent, or Firm*—Wegner, Stellman, McCord, Wiles & Wood

[57] ABSTRACT

A collimated head up display of pitch related information for an aircraft operator. A generated pitch signal combines a gyroscope signal referenced to the airframe with an inertial signal referenced to the head up display or combiner screen. A pitch error signal representing the difference between the generated pitch signal and the inertial pitch signal is limited and integrated to develop a pitch correction signal which is added to the gyroscope signal. Reference of the inertial signal to the combiner screen of the display eliminates static alignment errors. The pitch correction signal may be selected for display during alignment of the combiner screen.

16 Claims, 8 Drawing Figures

HEAD UP DISPLAY AND PITCH GENERATOR

This application is a division of Muller Ser. No. 307,726 filed Nov. 17, 1972 now U.S. Pat. No. 3,851,303.

This invention relates to a pitch signal generator which is particularly suited for use with an aircraft instrument for head up display of pitch related information.

Kirschner application Ser. No. 271,983, filed July 14, 1972 now U.S. Pat. No. 3,816,005, a continuation-in-part of Ser. No. 48,148 filed June 22, 1970, now abandoned, discloses a head up display with a semitransparent combiner screen on which images of a pitch scale and a flight path bar are projected. The optics of the system provide a collimated image in which the scale and flight path bar are viewed by the pilot against the background of objects in the outside world. During a landing approach for example the instrument provides for monitoring the flight path with the pilot operating the plane in such a manner that the flight path bar remains superimposed over the touchdown point at the end of the runway. The head up display requires an accurate pitch signal and might, for example, use a generated pitch signal of character disclosed in Astengo, Ser. No. 56,613 filed July 20, 1970, now U.S. Pat. No. 3,744,309, where filtered signals from a gyroscope and from an inertial sensor are summed and the sum is blended with the gyro signal. The present invention is an improvement of the pitch signal generator of Astengo and provides a novel combination of the Kirschner head up display with a pitch signal generator. The disclosures of both patents are incorporated by reference herein to supplement this disclosure.

The head up display instrument, when used to display pitch related information as the pitch scale and flight path bar of a visual approach monitor, requires proper alignment of the display and particularly of the combiner screen with the pitch measuring instruments mounted in the aircraft. In the Astengo pitch signal generator, the pitch signal is based on signals from a vertical gyroscope mounted to the airframe and a longitudinal accelerometer also mounted to the airframe. In order that the instrument operate properly, it is necessary that the longitudinal accelerometer, which supplies a long term pitch signal, and the display instrument be mounted on the airframe so that they are accurately aligned with respect to each other. The alignment condition of the display instrument is typically checked by physically leveling the aircraft with mechanical jacks, checking the level condition with surveying instruments and calibrating the pitch scale with respect to the horizon. This is a time consuming, expensive procedure and must be repeated periodically to detect and rectify mechanical drift in the elements of the system.

A feature of the invention is that the generated pitch signal input for the display indicia generator is provided from gyroscopic and inertial pitch signals by means for combining the gyroscope based pitch signal with a correction signal which is a function of the pitch error signal between the inertial pitch signal and the generated pitch signal.

A further feature is that the pitch error signal is limited to eliminated high amplitude components, as may occur during gusts, and the limited error signal is integrated to provide the correction signal.

Yet another feature of the invention, for an aircraft in which a pitch signal is based on a vertical gyroscope, is that the pitch error signal is connected with a switching limiter having a minimum output corresponding with the erection rate of the gyroscope. This feature is not required in an aircraft having an inertial navigation system as the pitch signal is not subject to gyroscope erection errors during accelerations.

Further features and advantages of the invention will readily be apparent from the following description and from the drawings, in which.

The invention is illustrated and described herein with a head up display system providing pitch and flight path information to the pilot for monitoring the approach of the aircraft to a landing. The invention is particularly suited for use in this specific system. However, some features of the invention are useful in providing a head up display of other pitch related information or for generating an accurate pitch signal for other purposes.

Figure 1:
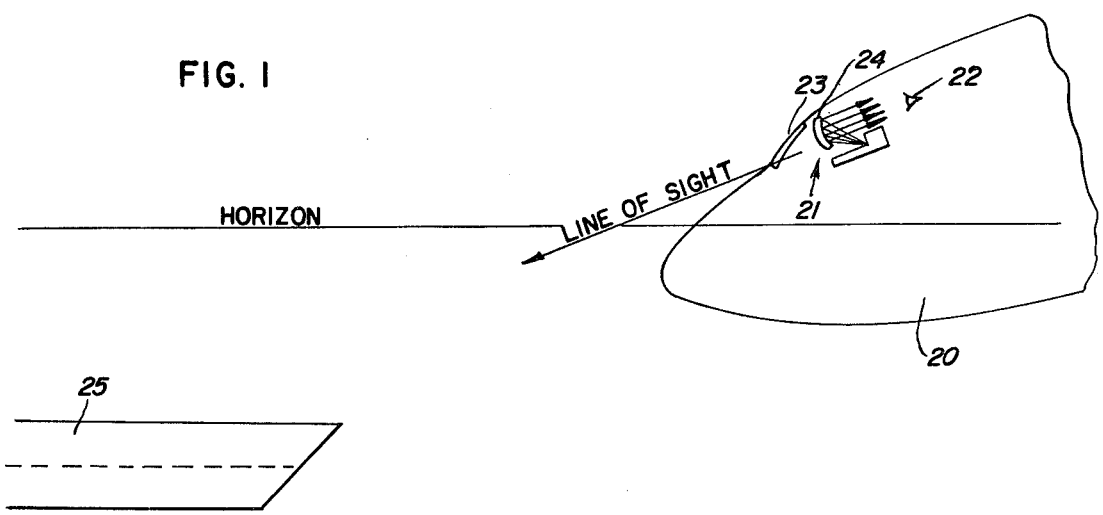
FIG. 1 is a diagrammatic illustration of an aircraft with a head up display for pitch related visual information used in monitoring the approach of the aircraft to a landing.

In FIG. 1, an aircraft 20 has a head up display 21 located between the pilot's eye 22 and windshield 23. The combiner screen 24 of head up display 21 has an operative position in the line of sight from the pilot's eye to the outside world. The head up display may, for example, be mounted on the glare shield above the instrument panel in the cockpit of the aircraft.

In a representative system providing flight path guidance to the pilot, a pitch scale and a flight path bar indicia are projected on the combiner screen 24 forming a collimated image which is viewed by the pilot superimposed on features of the outside world, as runway 25. The pilot coordinates his manipulation of the aircraft controls to place the flight path bar at the desired approach angle on the pitch scale and/or to align the bar with the desired touchdown point on the runway, as explained more fully in the Kirschner patent and in Bateman U.S. Pat. No. 3,654,806 and Bateman et al U.S. Pat. No. 3,686,626. If this relation is maintained, the plane follows a proper flight path to a landing.

Figure 2:
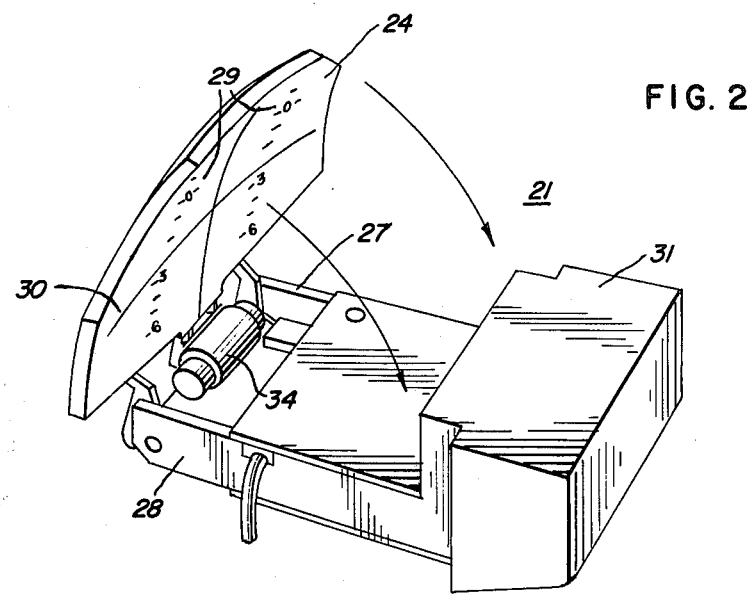
FIG. 2 is a perspective view of the head up display instrument.
Figure 3:
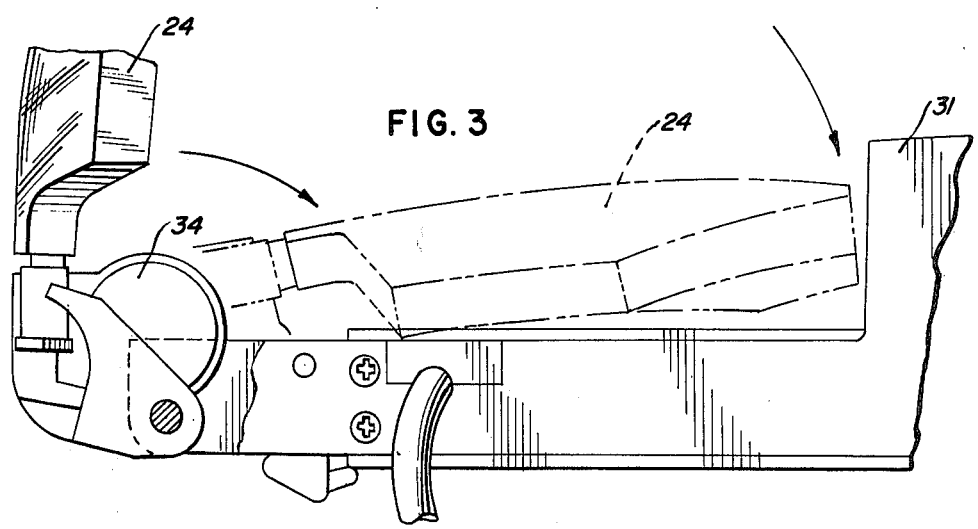
FIG. 3 is an enlarged fragmentary elevation of the combiner screen of the head up display instrument showing its operative and inoperative positions.

A portion of the display mechanism pertinent to the present invention is illustrated in FIGS. 2 and 3. The combiner screen 24, a partially reflective and appropriately curved optical element is pivotally mounted on the rails 27, 28 of the base of the display. Apparatus for projecting the image of the pitch scales 29 and flight path bar 30 on the combiner screen are located in housing 31.

The combiner screen 24 has an upright operating position, FIG. 2, and may be folded down to an inoperative position below the level of housing 31, as shown in broken lines in FIG. 3. Suitable spring detents (not shown) may be provided to retain the combiner screen in each of the two positions. A longitudinal accelerometer 34 is mounted on the head up display 21 and is preferably secured directly to the lower edge of combiner 24.

Figure 4:
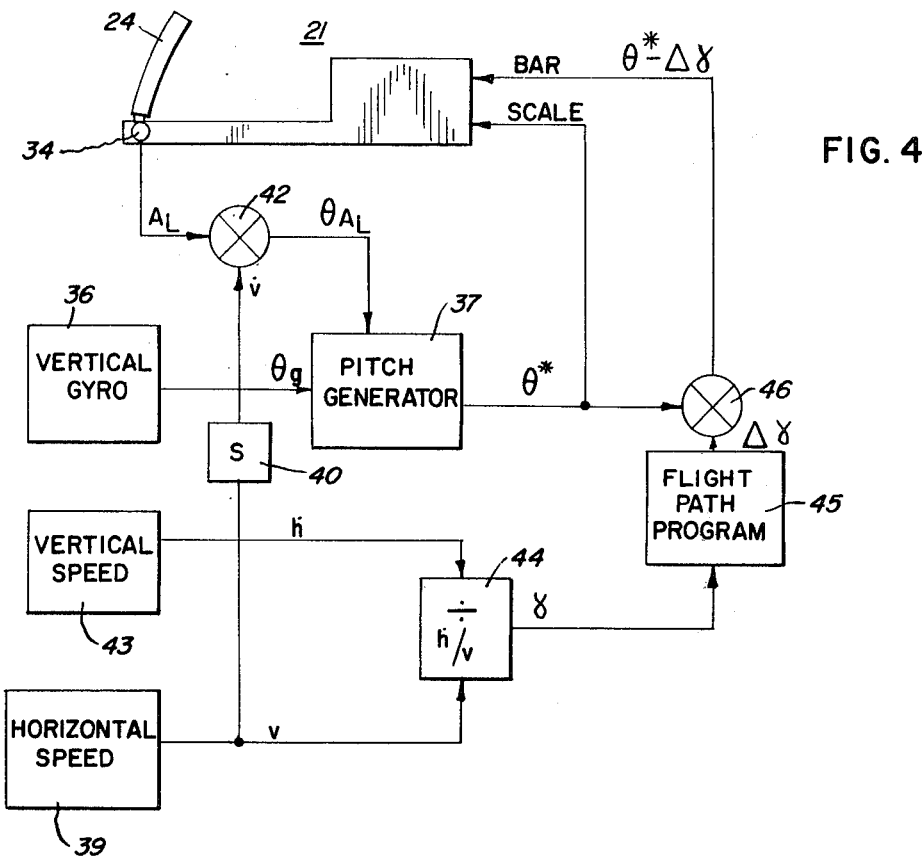
FIG. 4 is a simplified block diagram of a system for developing pitch related flight information signals for display on the combiner screen.

A basic system for developing pitch and flight path signals to provide a visual approach monitor display is illustrated in FIG. 4. A generated pitch signal $\theta^*$, which positions the pitch scale and is also a component of the signal driving the flight path bar, is generated from gyroscopic and inertial inputs. More particularly, vertical gyroscope 36 has an output $\theta_g$ which provides one input for pitch generator 37. The head up display 21 is mounted in the aircraft with the sensitive axis of accelerometer 34 parallel to the longitudinal axis of the airframe. The output signal $A_L$ of the accelerometer includes two terms, the longitudinal acceleration of the aircraft and the aircraft pitch attitude. A signal representing the horizontal speed V of the aircraft is provided from a suitable source 39, as an airspeed sensor, an inertial navigation system or the like. The speed signal is connected with a differentiator 40 having an acceleration output $\dot{V}$ which is subtracted from $A_L$ at summing point 42. The output of the summing point is an inertial pitch signal $\theta_{A_L}$ which provides accurate long term pitch information. $\theta_{A_L}$ and $\theta_g$ are combined in pitch signal generator 37 to produce $\theta^*$ which has the desirable short term attributes of $\theta_g$ and long term attributes of $\theta_{A_L}$.

A source 43 of vertical speed signal $\dot{h}$ provides the numerator input to a flight path divider circuit 44 having the horizontal speed signal V for the denominator input. The divider output is a flight path signal $\gamma$ which is connected with a flight path program generator 45. A signal $\Delta$ from the generator 45 represents the difference between the actual and desired flight paths and is summed with $\theta^*$ providing a bar signal connected with the head up display to position the flight path bar 30.

The pitch generating position of the system of FIG. 4 differs from that of the Astengo application in that the longitudinal accelerometer 34 is mounted on the head up display and preferably on the combiner screen itself, rather than directly on the airframe. Thus, mechanical misalignment or drift between the combiner screen 24 and the airframe are automatically eliminated.

Figure 5:
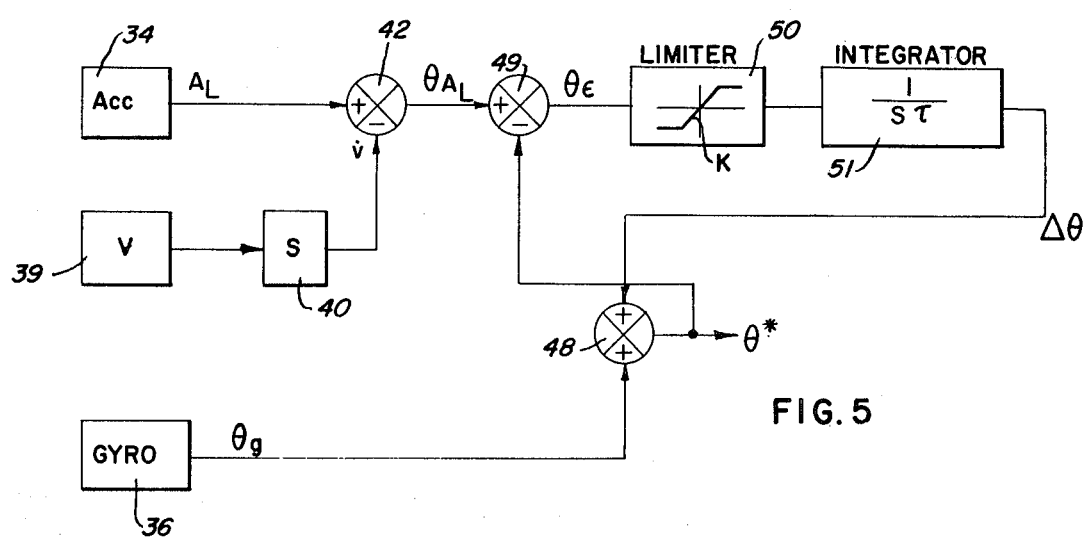
FIG. 5 is a block diagram of a circuit for generating an accurate pitch signal.

A preferred pitch signal generator is illustrated in FIG. 5. The input signals, as in FIG. 4, are $A_L$ from longitudinal accelerometer 34, V from a horizontal speed source 39 and $\theta_g$ from vertical gyroscope 36. Forward acceleration $\dot{V}$ is subtracted from $A_L$ at summing junction 42 providing inertial pitch signal $\theta_{A_L}$.

$\theta_g$ is added to a pitch correction signal $\Delta\theta$ at summing junction 48 to provide the generated pitch signal $\theta^*$. The pitch correction signal $\Delta\theta$ is a function of the pitch error signal $\theta_e$ which is the difference between $\theta^*$ and the accurate long term pitch signal $\theta_{A_L}$. $\theta^*$ is subtracted from $\theta_{A_L}$ at summing junction 49, the output of which is $\theta_e$. The pitch error signal is connected with a limiter 50 having a linear transfer function with a gain of K between upper and lower limits. The limiter does not pass high amplitude pitch error signals which represent transient pitch conditions resulting from gusts or the like. The limited pitch error signal is connected with an integrator 51 having a time constant $\tau$. The limited and integrated pitch error signal provides pitch correction signal $\Delta\theta$.

The longitudinal accelerometer utilized in this system may be of any suitable type, but I prefer to use a servoed accelerometer as, for example, that shown in Jacobs U.S. Pat. No. 3,702,073. A pendulous accelerometer would also be suitable, but space requirements adjacent the combiner 24 present practical difficulties in mechanical design and mounting.

An analysis of the dynamic characteristics of the pitch generator is of interest. At the summing junction 48, $$\theta^* = \Delta\theta + \theta_g$$

or, rearranging $$\Delta\theta = \theta^* - \theta_g$$

Considering the pitch correction circuit $$\Delta\theta = (\theta_{A_L} - \theta^*)\frac{K}{s\tau}$$

Rearranging and substituting $$(\theta_{A_L} - \theta^*)\frac{K}{s\tau} = \theta^* - \theta_g$$

Solving for $\theta^*$, $$\theta^* = \theta_g \frac{s\frac{\tau}{K}}{1+s\frac{\tau}{K}} + \frac{\theta_{A_L}}{1+s\frac{\tau}{K}}$$

The transfer functions for $\theta_g$ and $\theta_{A_L}$ complement each other exactly. If there is no offset error between the gyroscope and the longitudinal accelerometer, $\theta_g$ will be exactly equal to $\theta_{A_L}$, the dynamic terms will cancel out and $\theta^*$ will be equal to $\theta_g$. With an offset error, the dynamic terms are complementary, $\theta_g$ providing the short term high frequency signal components and $\theta_{A_L}$ providing the long term low frequency signal components. The calculated pitch signal $\theta^*$ is free of error due to mechanical misalignment of the gyroscope and any error due to misalignment of the accelerometer is automatically eliminated by virtue of the fact that it is mechanically fixed to the combiner 24.

Figure 6:
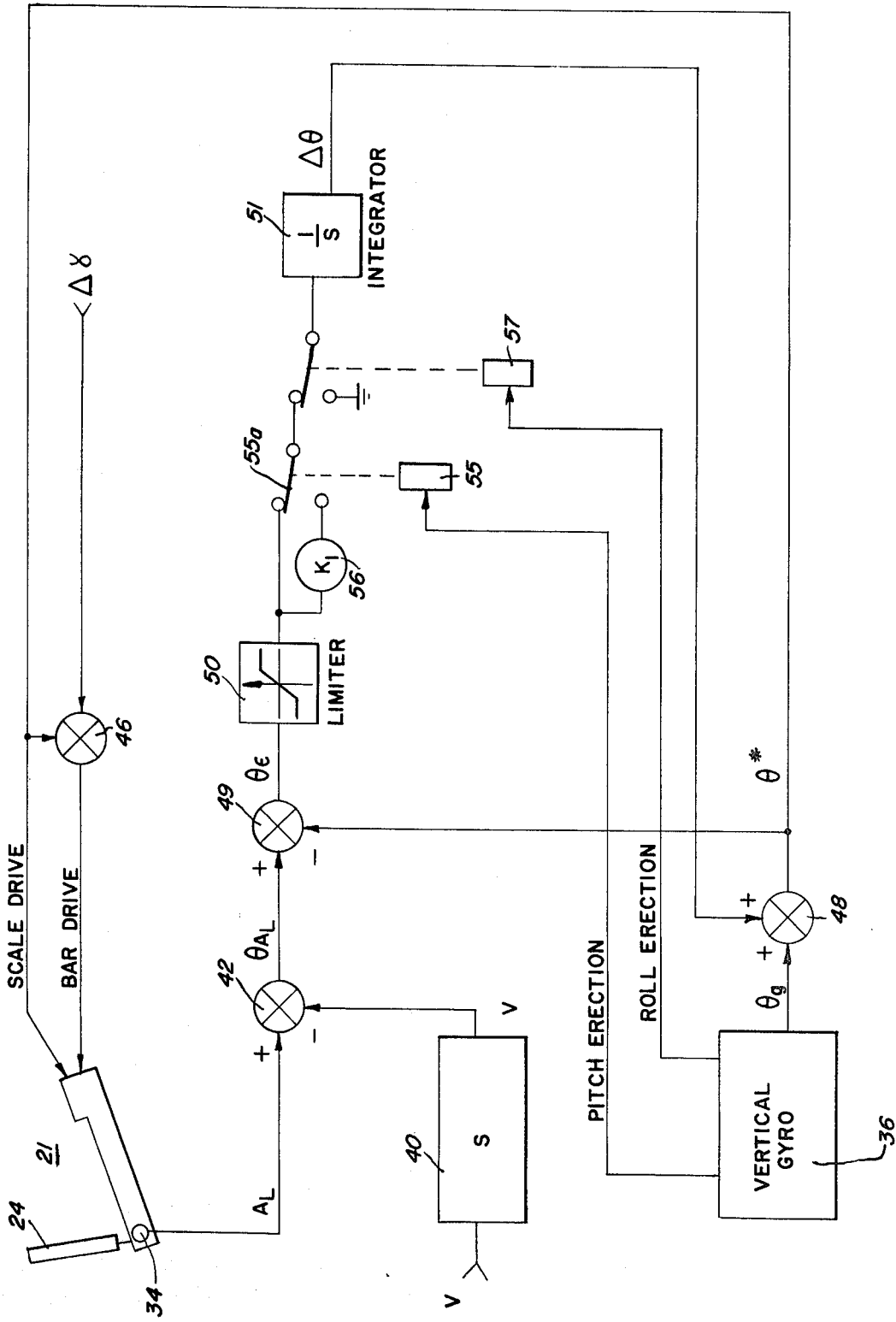
FIG. 6 is a block diagram of one form of pitch generator for the head up display.

The head up display of FIG. 4 with the pitch signal generator of FIG. 5 are illustrated in FIG. 6. Elements which have been identified above are assigned the same reference numeral.

Head up display 21 has scale drive and bar drive input signals connected thereto to position the pitch scale and flight path bar images on the combiner 24. The pitch signal $\theta^*$ is computed from the gyroscope based pitch signal $\theta_g$ and the inertial based pitch signal $\theta_{A_L}$ derived from accelerometer 34 which is physically mounted on combiner 24. Pitch error signal $\theta_e$, the difference between $\theta^*$ and $\theta_{A_L}$, is connected with limiter 50 and the output of the limiter integrated at 51 to provide pitch correction signal $\Delta\theta$, which is combined with $\theta_g$ at summing point 48. $\theta^*$ is the pitch scale drive input signal. A flight path signal $\Delta\gamma$ is combined with $\theta^*$ at summing point 46, providing the bar drive signal.

Vertical gyroscope 36 is subject to transient errors during aircraft maneuvers. When the errors become excessive, the information displayed on combiner 24 is unreliable. In the system of FIG. 6, the gyroscope condition is sensed in terms of the gyroscope pitch and roll erection signals, which are functions of the displacement of the vertical gyro from a vertical attitude. With a pitch erection error, which for example might occur as a result of a longitudinal acceleration of the aircraft, causing a displacement of the vertical gyro from its vertical position, relay 55 is energized. This actuates switch 55a, connecting an amplifier 56 with a gain $K_1$ in the signal path between limiter 50 and integrator 51. The gain $K_1$ of amplifier 56 is substantially less than 1 so that the erroneous pitch signal $\theta_g$ does not result in the accumulation of a significant incorrect signal in the output of integrator 51. When the aircraft is in a turn, it has a roll attitude other than a wings level condition. As the turn radius is made smaller, the roll condition becomes greater, and a pitch error may occur. The roll erection signal provides an indication of an aircraft condition with an erroneous pitch signal, as during a turn maneuver. The roll erection signal actuates relay 57 grounding the input of integrator 51, resulting in maintenance of the pitch correction signal $\Delta\theta$ until the turn is completed.

Figure 7:
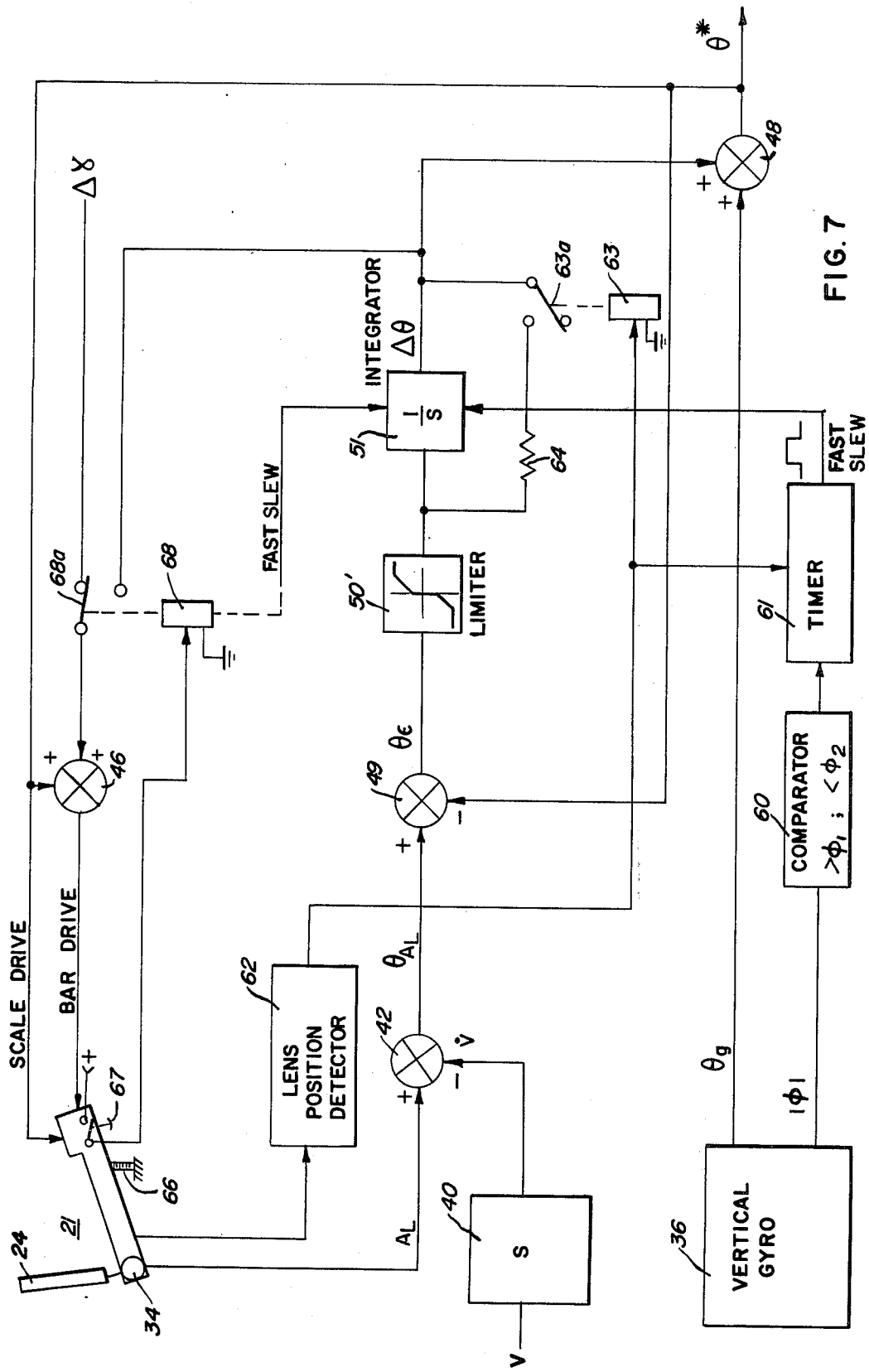
FIG. 7 is a block diagram of a preferred form of pitch signal generator for the head up display.

FIG. 7 illustrates a preferred system for an aircraft utilizing a vertical gyroscope as a source of pitch signal. Again, head up display 21 is provided with scale and bar drive inputs to position the pitch scale and flight path bar indices on combiner 24. The calculated pitch signal $\theta^*$ is the sum of the gyroscope based pitch signal $\theta_g$ from vertical gyroscope 36 with pitch correction signal $\Delta\theta$. As in FIG. 6, $\theta^*$ is summed with inertial pitch signal $\theta_{A_L}$ from combiner mounted accelerometer 34, and the error signal $\theta_e$ is limited and integrated to establish correction signal $\Delta\theta$.

The pitch based cutout of the integrator is eliminated and in lieu thereof a switching limiter 50' is substituted for the linear limiter 50. The minimum output of limiter 50' is a signal equal to the pitch erection rate of vertical gyroscope 36. This minimum error signal at the output of the limiter enables the calculated pitch signal to follow the erection of the gyroscope as it recovers from a longitudinal acceleration, or other disturbance which might cause a pitch erection error. Switching limiter 50' has a linear band of operation above the minimum outputs and a maximum output, all as indicated by the graphical representation of the limiter transfer characteristic in FIG. 7.

Rather than the hold circuit for the integrator during an aircraft turn, the system of FIG. 7 has a provision for rapid modification of pitch correction signal $\Delta\theta$, and thus of the calculated pitch signal $\theta^*$, as the aircraft comes out of a roll to a wings level condition. This is achieved by reducing the time constant $\tau$ of the integrator, providing a fast slew operation. A signal $/\phi/$ representing the absolute value of the roll angle of the aircraft is provided by vertical gyroscope 36. Comparator 60 responds to a sequence of roll conditions indicating the entry into and recovery from a roll and actuates timer 61 generating a control signal for the integrator which reduces the time constant. In a typical system, the time constant $\tau$ of integrator 51 may be of the order of 10 to 12 seconds and is reduced to 5 seconds during the fast slew condition. The comparator 60 may, for example, respond to a sequence of roll conditions in which $/\phi/$ is first greater than $\phi_1$ (as 15°) followed by a condition in which $/\phi/$ is less than $\phi_2$ (as 8°) actuating the timer to reduce the integrator time constant for 5 seconds. The sequence of roll angle measurements indicates the entry of the aircraft into and its recovery from a turn. Provision of the fast slew condition effects correction of the calculated pitch signal $\theta^*$ during the last portion of the recovery from roll so that the display is stabilized as the aircraft reaches a wings level condition. If the maximum aircraft roll is less than $\phi_1$, the pitch error is insufficient to require rapid correction.

Fast slew operation is also utilized when the combiner screen 24 is first moved to its operative position. With the combiner screen 24 folded down in inoperative position, the output of accelerometer 34 is inaccurate. When the combiner is raised, the integrator requires a finite time to charge to $\Delta\theta$. In order that the display be usable as rapidly as possible when the combiner screen is moved to its upright position, the integrator time constant is reduced.

A lens position detector 62 operates relay 63 when the combiner lens 24 is folded down, connecting resistor 64 across integrator 51. Shunt resistor 64 bypasses the integrator so that it does not acquire a false charge while the combiner lens is in its folded or inoperative position. When the lens is raised to its operative position, contact 63a opens enabling the pitch correction circuit to operate. Timer 61 is actuated reducing the time constant of integrator 51 for a period of time following movement of the lens to its operative position so that the pitch circuit stabilizes rapidly.

An important feature of the system of FIG. 7 is the provision for mechanical alignment of the combiner 24. The difficulty of bore sighting the display when mounted in an aircraft is described above. The system of FIG. 7 provides for alignment without the need for leveling the aircraft.

The physical position of the head up display with respect to the frame of the aircraft is altered by manipulating pitch adjustment screw 66 which tilts the unit with respect to the aircraft. A lock nut (not shown) may be provided to prevent the display position from changing as a result of vibration or the like. Alignment of the head up combiner without leveling the aircraft is made possible by displaying on the screen pitch related indicia which indicate any deviation of the position of the combiner from its desired alignment with the airframe. A momentary contact switch 67 is closed by the operator during the alignment procedure. This switch actuates the relay 68 which performs two functions. First, switch 68a connects the pitch correction signal $\Delta\theta$ from the output of integrator 51 with an input to summing point 46 in place of the $\Delta\gamma$ bar signal. Thus, the bar drive input to the display is the sum of $\theta^*$ and $\Delta\theta$. With the aircraft at rest the vertical gyroscope output $\theta_g$ is not subject to dynamic errors. The output of longitudinal accelerometer 34 represents only the relative pitch angle of combiner 24 on which it is mounted. Thus, the error signal $\theta_e$ represents the misalignment between the combiner 24 and the airframe and vertical gyroscope. The operator adjusts the position of the combiner by manipulation of screw 66 to bring the bar into alignment with the zero of the pitch scale. During the alignment procedure relay 68 also provides for fast slew operation of integrator 51.

Figure 8:
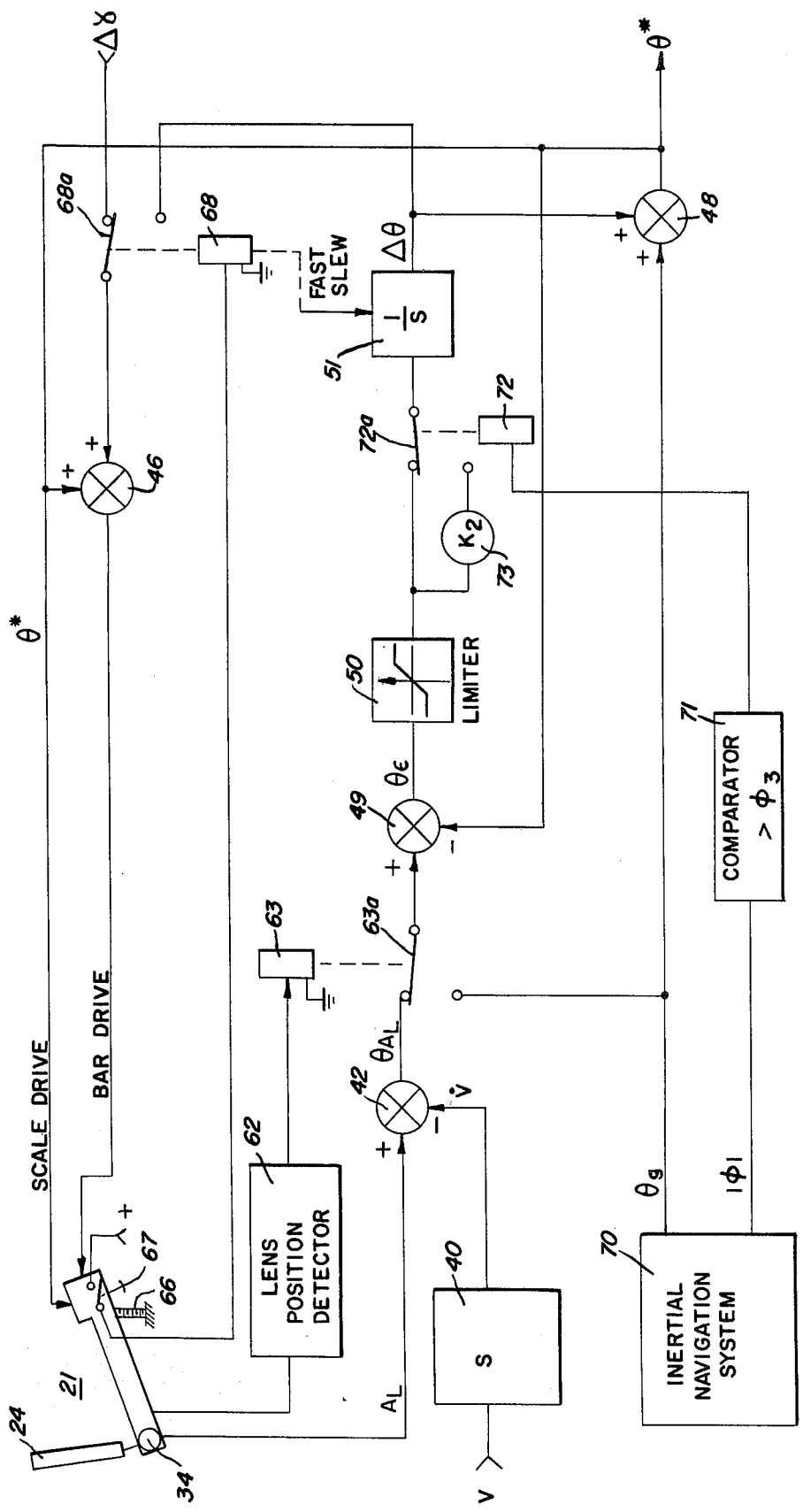
FIG. 8 is a block diagram of a modified pitch signal generator for a head up display used in an aircraft having an inertial navigation system.

The system of FIG. 8 differs from that of FIG. 7 in that the source for the "gyroscope based" aircraft pitch signal $\theta_g$ is an inertial navigation system 70 which is provided on some aircraft. The inertial navigation system pitch output is not subject to the erection errors of a vertical gyroscope and the system is somewhat simpler than that of FIG. 7. The $\theta^*$ pitch circuit is used primarily to compensate the display for changes in position of combiner screen 24 and to facilitate display alignment as described above. The elements which have been identified and described previously are assigned the same reference numerals and will not be discussed in detail again.

In a turn the aircraft pitch angle increases. To avoid loading integrator 51 with an incorrect signal, operation of the circuit is modified during the turn. A roll signal $/\phi/$ from the inertial navigation system 70 is connected with comparator 71. When the roll angle exceeds an angle $\phi_3$, as 12°, indicating a turn condition, relay 72 is actuated, operating switch 72a to connect the input of integrator 51 with the output of limiter 50 through an amplifier 73 having a gain $K_2$, less than 1. This reduces the error input signal to the integrator for so long as the aircraft's roll condition exceeds $\phi_3$.

The other significant difference from the non-INS system of the FIG. 7 is that the pitch correction circuit is maintained in standby condition by substituting $\theta_g$ for $\theta_A$ when the combiner 24 is in its inoperative position. Lens position detector 62 actuates relay 63 to control switch 63a'. When the combiner is in operative position $\theta_A$ is connected with summing junction 49. However, when combiner lens 24 is folded down, switch 63a' connects $\theta_g$ from the inertial navigation system with summing junction. There is no error signal and integrator 51 is not loaded with false information.

I claim:

1. A pitch signal generator for an aircraft, comprising:
    a source of gyroscope based aircraft pitch signal;
    a source of inertial based aircraft pitch signal;
    means for combining the gyroscope based pitch signal with a pitch correction signal to produce a generated pitch signal;
    means for subtracting the generated pitch signal from the inertial based pitch signal to produce a pitch error signal; and
    means responsive to said pitch error signal to generate said pitch correction signal.

2. The pitch signal generator of claim 1 in which said pitch correction signal generating means includes means for limiting said pitch error signal.

3. The pitch signal generator of claim 1 in which said pitch correction signal generating means includes means for integrating said pitch error signal.

4. The pitch signal generator of claim 2 in which said pitch correction signal generating means includes means for inegrating said limited pitch error signal.

5. A pitch signal generator for an aircraft, comprising:
    a source of gyroscope based aircraft pitch signal subject to long term error;
    a source of inertial based aircraft pitch signal subject to short term error;
    a source of pitch correction signal for correcting the long term error of the gyroscope based pitch signal;
    a first summing junction having one input connected with the source of gyroscope based pitch signal and another input connected with the source of pitch correction signal, and an output for the generated pitch signal;
    a second summing junction having one input connected with the source of inertial based pitch signal and another input connected with the output of the first summing junction, the output of the second summing junction being a pitch error signal representing the difference between the inertial based pitch signal and the generated pitch signal;
    a limiter connected with the output of said second summing junction, limiting the amplitude of the pitch error signal to minimize response to transient conditions; and
    an integrator connected with the output of said limiter to integrate the limited pitch error signal, providing the pitch correction signal which is connected with an input of said first summing junction.

6. The pitch signal generator of claim 5 in which said generated pitch signal, $\theta^*$, is defined by the relationship:

$$\theta^* = \theta_g \frac{s\frac{\tau}{K}}{1+s\frac{\tau}{K}} + \frac{\theta_{A_L}}{1+s\frac{\tau}{K}}$$

where
$\theta_g$ is the gyroscope based pitch signal
$\theta_{A_L}$ is the inertial based pitch signal
K is the gain of the linear portion of the characteristic of the pitch error signal circuit
$1/s\tau$ is the transfer characteristic of the integrator.

7. The pitch signal generator of claim 1 in which said source of inertial based aircraft pitch is a longitudinal accelerometer having an output signal representing the sum of forward acceleration and aircraft pitch, and including a source of signal representing forward acceleration of the aircraft and means for subtracting said forward acceleration signal from the accelerometer output signal.

8. The pitch signal generator of claim 1 in which said source of gyroscope based pitch signal is a vertical gyroscope and including means for sensing an error of said vertical gyroscope and means for modifying the function of said pitch error signal in accordance with the gyroscope error.

9. The pitch signal generator of claim 8 including means for limiting said pitch error signal and means for integrating the limited pitch error signal to establish said pitch correction signal, wherein the integration function of the pitch error signal is modified in accordance with the gyroscope error.

10. The pitch signal generator of claim 8 including means responsive to a pitch erection error of the gyroscope for reducing the gain of the pitch error signal.

11. The pitch signal generator of claim 9 including means responsive to a roll erection error of the gyroscope for disconnecting said integrator from said limiter.

12. The pitch signal generator of claim 4 in which said pitch error signal limiting means is a switching limiter having a minimum output equal to the pitch erection rate of the gyroscope from which the gyroscope based pitch signal is obtained.

13. The pitch signal generator of claim 9 including means for sensing a turn condition of the aircraft and means responsive to the occurrence of a turn condition for reducing the time constant of the means for integrating the limited pitch error signal.

14. The pitch signal generator of claim 13 in which the execution of a turn by the aircraft is sensed from the roll angle of the aircraft.

15. The pitch signal generator of claim 4 in which the source of gyroscope based pitch signal is an inertial navigation system and including means sensing a turn condition of the aircraft and means responsive to the turn condition for modifying the function of the pitch error signal.

16. The pitch signal generator of claim 15 in which the gain of the pitch error signal is reduced during execution of a turn.

* * * * *

UNITED STATES PATENT AND TRADEMARK OFFICE
CERTIFICATE OF CORRECTION

PATENT NO. : 3,967,799
DATED : July 6, 1976
INVENTOR(S) : Hans Rudolf Muller

It is certified that error appears in the above-identified patent and that said Letters Patent are hereby corrected as shown below:

Change the title "HEAD UP DISPLAY AND PITCH GENERATOR" to -- PITCH SIGNAL GENERATOR --.

Signed and Sealed this

Twenty-first Day of September 1976

[SEAL]

Attest:

RUTH C. MASON
*Attesting Officer*

C. MARSHALL DANN
*Commissioner of Patents and Trademarks*